(12) United States Patent
Dicke

(10) Patent No.: US 6,401,801 B1
(45) Date of Patent: Jun. 11, 2002

(54) TWIN FAN COOLING SYSTEM

(75) Inventor: Paul A. Dicke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/692,509

(22) Filed: Oct. 19, 2000

Related U.S. Application Data

(60) Provisional application No. 60/170,250, filed on Dec. 10, 1999.

(51) Int. Cl.⁷ .................................................. F01P 3/00
(52) U.S. Cl. ........................... 165/51; 165/122; 165/41; 165/299; 180/68.1; 123/41.49; 123/41.33
(58) Field of Search ............................... 165/41–43, 51, 165/122, 299, 140; 180/68.1; 123/41.12, 41.31, 41.49, 41.64, 196 AB

(56) References Cited

U.S. PATENT DOCUMENTS

| | | | |
|---|---|---|---|
| 2,177,686 A | | 10/1939 | Bracken et al. |
| 2,184,837 A | * | 12/1939 | Hemming .................... 165/122 |
| 2,729,203 A | | 1/1956 | Prendergast |
| 3,203,499 A | * | 8/1965 | Bentz et al. ................... 165/51 |
| 3,752,132 A | | 8/1973 | Bntz et al. |
| 3,762,489 A | * | 10/1973 | Proksch ...................... 180/68.1 |
| 3,866,580 A | * | 2/1975 | Whitehurst et al. ........... 165/51 |
| 3,868,992 A | * | 3/1975 | Getz et al. ..................... 165/51 |
| 3,921,603 A | * | 11/1975 | Bentz et al. .............. 123/41.33 |
| 4,382,481 A | | 5/1983 | Moore |
| 4,519,343 A | * | 5/1985 | Hayashi et al. .......... 123/41.49 |
| 4,520,767 A | | 6/1985 | Roettgen et al. |
| 4,565,075 A | * | 1/1986 | Drucker et al. ............. 165/122 |
| 4,590,892 A | | 5/1986 | Nose et al. |
| 4,620,509 A | | 11/1986 | Crofts |
| 4,825,815 A | | 5/1989 | Turner |
| 5,046,554 A | | 9/1991 | Iwaski et al. |
| 5,215,044 A | | 6/1993 | Banzhaf et al. |
| 5,649,587 A | | 7/1997 | Plant |
| 5,660,149 A | | 8/1997 | Lakerdas et al. |
| 5,845,612 A | * | 12/1998 | Lakerdas et al. ......... 123/41.49 |
| 6,129,056 A | * | 10/2000 | Skeel et al. ............... 123/41.49 |
| 6,216,778 B1 | * | 4/2001 | Corwin et al. ............... 165/299 |

* cited by examiner

Primary Examiner—Henry Bennett
Assistant Examiner—Terrell McKinnon
(74) Attorney, Agent, or Firm—Blackwell Sanders; Kelsey L. Milman

(57) ABSTRACT

A fan cooling system for cooling heat transfer devices associated with a particular work machine, the system including a plurality of fans positioned and located in the same plane preferably one on top of the other, a first heat transfer device positioned upstream relative to the plurality of fans, a second heat transfer device positioned downstream and adjacent to one side of the fans, a third heat transfer device positioned downstream and adjacent the opposite side of the fans, and suitable shrouds or other separating members positioned around the plurality of fans so as to guide the flow of air into and expelled by each respective fan, the fans being operable to as to create air flow through the first, second and third heat transfer devices. In one embodiment of the present system the first upstream heat transfer device has higher fin or core density as compared to the fin density associated with the second and third heat transfer devices respectively, the first heat transfer device functioning as a filter trapping debris on the outside of the core face. This core density arrangement ensures that whatever passes through the upstream core will also pass through the downstream cores. The present fan/core arrangement results in a very compact and well-balanced construction, which substantially reduces the overall size of the cooling package and improves the overall effective cooling capacity of the system.

25 Claims, 3 Drawing Sheets

Fig-2-

TWIN FAN COOLING SYSTEM

This application claims the benefit of prior provisional patent application Ser. No. 60/170,250 filed Dec. 10, 1999.

TECHNICAL FIELD

This invention relates generally to the field of heat dissipation equipment for use in work machines such as construction, earthmoving and other types of machines and, more particularly, to a pair of fans positioned in a vertically stacked arrangement for cooling a plurality of heat transfer devices positioned therearound.

BACKGROUND ART

Construction and excavation type work machines as well as a wide variety of other types of work machines are used commonly for a wide variety of various construction and development purposes. Heat is a natural by-product of the engine and the other functional equipment associated with work machines and must therefore be dissipated efficiently in order to keep the engine and other equipment within proper operating temperature limits for optimum and continued sustained performance. As a result, a wide variety of different types of cooling systems are utilized to accomplish this task.

There is also a continuous need to improve emissions and the efficiency of work machines, which needs may be achieved in part by improving the overall performance and efficiency of the cooling systems and other heat dissipation equipment associated with a particular work machine. Typically, a fan is installed in series with a plurality of heat exchanger cores. Such prior art fan configurations typically impede optimal heat dissipation and optimal positioning of the heat exchanger cores and adversely affect the efficiency and balance of the overall machine. Such prior art designs also add to the overall size of the machine which must be kept to a minimum due to space limitations as well as dimensional constraints on operator visibility. In this regard, the packaging length of the cooling system is typically limited by the axial spacing of the power train components, and the width of such system is typically limited by the existing frame rail dimensions, and the desire for operator visibility puts limitations on cooling systems and therefore hood height. Such serial positioning of the heat exchanger cores also makes it difficult to clean out debris carried by the air flow and blown into the fins of the various serially positioned heat exchanger cores. Debris collected in the fins insulates the transfer of heat therefrom thereby adversely impacting the performance and efficiency of the heat dissipation equipment and the overall machine.

Utilizing a single fan to provide cooling to a plurality of heat exchanger cores also requires use of a larger diameter fan to accomplish the necessary cooling. This may translate into a larger axial length since fan depth increases with fan size. This arrangement likewise adds to the overall size of the cooling system and the machine.

Future challenges in designing machine cooling systems also extend to reducing the overall noise associated with working machines. In this regard, it is necessary to attenuate engine and equipment related noise emitted by work machines in order to meet stricter noise regulations globally. Fans installed serially or axially usually add to the overall size of the system thereby affording more opportunity for the sound waves emitted therefrom to propagate to the exterior of the machine thereby contributing to noise pollution.

It is therefore desirable to provide a fan arrangement which will dissipate heat more efficiently from a plurality of heat exchanger cores in a work machine; to provide a well balanced construction wherein the cooling system package is reduced in overall size; to package a plurality of heat exchanger cores about the fan arrangement; to reduce the occurrence of debris entering the cooling system package; and to attenuate noise emitted by the fans in all directions.

Accordingly, the present invention is directed to overcoming one or more of the problems as set forth above.

DISCLOSURE OF THE INVENTION

In one aspect of this invention, a cooling system for cooling heat transfer devices in a work machine is disclosed. The cooling system includes a plurality of fans positioned so as to be located in the same plane, a first heat transfer device positioned upstream from the plurality of fans, a second heat transfer device positioned downstream and adjacent one side of the fans, a third heat transfer device positioned downstream and adjacent the opposite side of the fans, and the fans creating air flow through the first, second and third heat transfer devices.

In another aspect of this invention, a method for cooling heat transfer devices in a work machine is disclosed. The method includes the steps of positioning a plurality of fans so as to be located in the same plane, positioning a first heat transfer device upstream from the plurality of fans, positioning a second heat transfer device downstream and adjacent to one side of the fans, positioning a third heat transfer device downstream and adjacent to the opposite side of the fans, and creating air flow through the first, second and third heat transfer devices by the fans.

BRIEF DESCRIPTION OF THE DRAWINGS

For a better understanding of the present invention, reference may be made to the accompanying drawings in which.

BEST MODE FOR CARRYING OUT THE INVENTION

Figure 1:
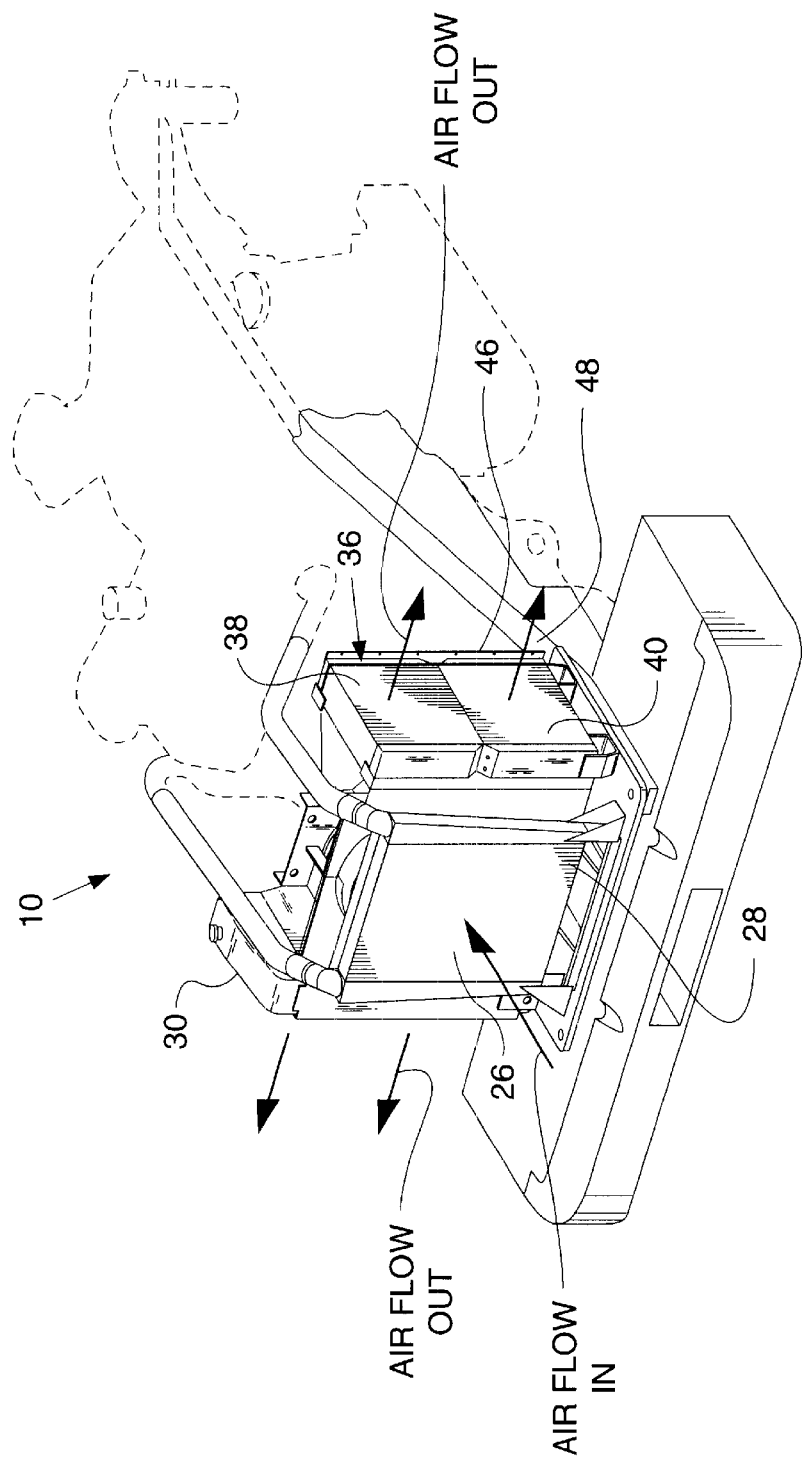
FIG. 1 is a perspective view of one embodiment of the present cooling system wherein other equipment associated with a work machine are shown in phantom outline form.
Figure 2:
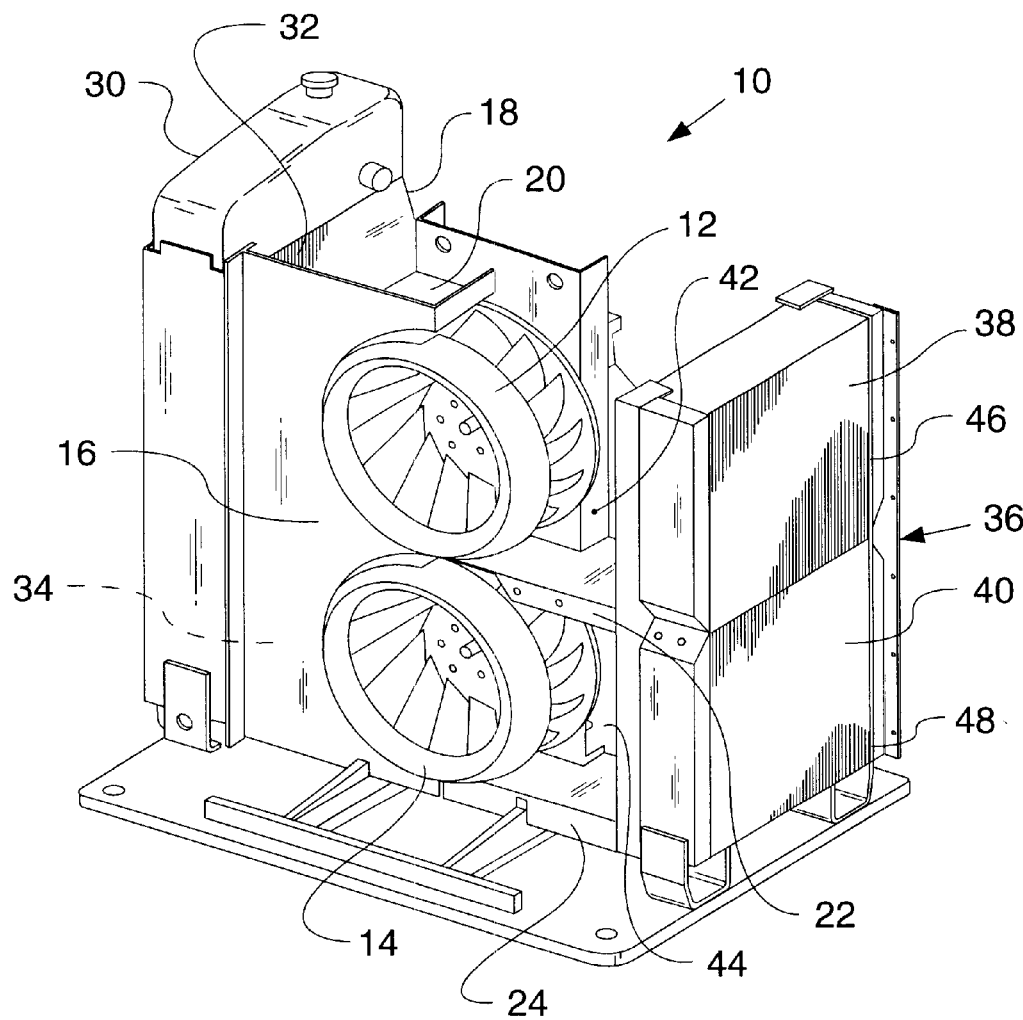
FIG. 2 is a perspective view of the cooling system illustrated in FIG. 1 depicting the inter-positioning of the twin radial fans relative to the heat-exchanger cores positioned on each opposite side of the respective fans, the upstream heat exchanger core and the shrouding associated therewith being removed for viewing the twin fan arrangement.
Figure 3:
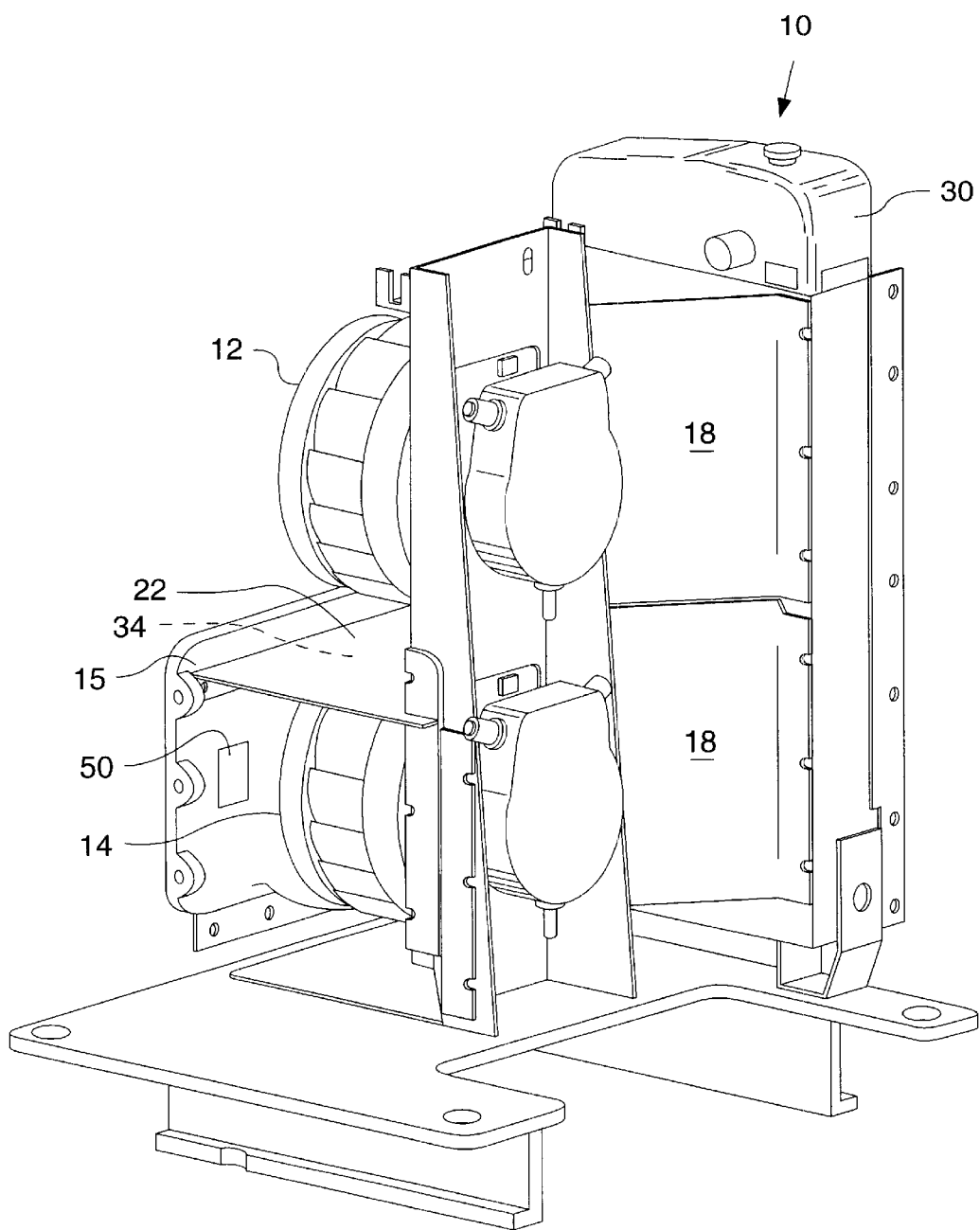
FIG. 3 is a rear perspective view of the apparatus illustrated in FIGS. 1 and 2 wherein the upstream core and the cores associated with one opposite side of the respective fans as well as some of the associated shrouding are again removed for exposing portions of the fans.

Referring to FIGS. 1, 2 and 3, numeral 10 represents one embodiment of the present twin fan cooling system in a typical work machine incorporating the principles of the present invention. In the embodiment illustrated, substantially identical radial fans 12 and 14 are vertically positioned one on top of the other as best shown in FIGS. 2 and 3. However, if the cooling area is more wide than tall, the radial fans 12 and 14 could easily be arranged horizontally. Fans 12 and 14 operate in a sucker mode relative to the upstream ATAAC core 26 and in blower mode relative to the downstream cores 30, 38, 40 wherein air intake occurs upstream in front of the fans and the air is expelled radially downstream through the sides of the fans. The construction and operation of radial fans are well known in the art. The use of two smaller radial fans in place of one larger fan translates into less axial length required for the fan package since fan depth increases with the diameter of the fan.

The present fan arrangement includes a plurality of shrouds such as the shrouds 15, 16, and 18, along with a plurality of separating members 20, 22 and 24 which are positioned and located both upstream and downstream of the fans 12 and 14 as well as in between the fans 12 and 14. The shrouds 15, 16 and 18 along with the separating members 20,22 and 24 function to not only direct the air flow to the specific heat exchanger core, but to separate the air flow streams between the two fans to substantially prevent internal recirculation of such air flow when the two fans 12 and 14 are operating at different speeds. Shrouds 16 and 18 along with top separating member 20 middle separating member 22 and bottom separating member 24 also function to prevent air flow from escaping out of the top and bottom portions of each respective fan when air is expelled radially therefrom.

As best illustrated in FIG. 1, a first heat transfer device 26 is positioned upstream in front of fans 12 and 14 in relatively close proximity thereto. In one embodiment of the present invention, heat transfer device 26 is an air-to-air aftercooling core (ATAAC core) which is typically utilized in work machines, although it is recognized and anticipated that core 26 can be any heat transfer device associated with a particular work machine. As best illustrated in FIG. 1, ATAAC core 26 substantially covers the frontal surface area of fans 12 and 14 whereby air drawn in by fans 12 and 14 must first pass through core 26. The vertical arrangement of fans 12 and 14 provides more fan coverage of the ATAAC frontal area thereby enabling the fans 12 and 14 to be operated at lower fan speeds which means less noise. ATAAC core 26 includes a plurality of fins 28, the core density of the ATAAC core 26 being a function of core configuration, depth and fin density. The upstream shroud 15 functions to enclose a space 34 between the ATAAC core 26 and the inlet of the fans 12 and 14, as shown in FIG. 2.

As best illustrated in FIGS. 1, 2 and 3, a second heat transfer device 30 is positioned adjacent to one side of the fans 12 and 14 in relatively close proximity thereto and downstream from the ATAAC core 26. In one embodiment of the present invention, heat transfer device 30 is a radiator core for engine coolant, although it is likewise recognized and anticipated that core 30 can also be any heat transfer device associated with a particular work machine. The shroud 16 preferably extends from a front peripheral edge of fans 12 and 14 to the front portion of the core device 30 as best illustrated in FIG. 2, and shroud 18 preferably extends from a rear peripheral edge of fans 12 and 14 to the rear portion of core device 30 as best illustrated in FIG. 3. A top separating member 20 preferably extends between the upper portion of fan 12 and core device 30 between shrouds 16 and 18 as best illustrated in FIG. 2 and a bottom separating member 24 is similarly located adjacent the lower portion of fan 14. These shrouds 16 and 18 along with separating members 20 and 24 function to enclose a space (not shown) between fans 12 and 14 and core device 30, whereby air expelled radially by the fans on this particular side may not escape from the space without first passing through core device 30. Core device 30 likewise includes a plurality of fins 32 (FIG. 2), the density of which determines the heat transfer capacity of the core 30.

As best illustrated in FIGS. 1 and 2, another heat transfer device 36 is positioned adjacent the opposite side of fans 12 and 14 in relatively close proximity thereto and downstream from the ATAAC core 26 similar to the positioning and arrangement of core device 30 on the opposite side thereof. In one embodiment of the present invention, heat transfer device 36 includes a pair of core devices 38 and 40, core device 38 being a hydraulic oil core device and core device 40 being a transmission oil core device. Here again, it is recognized and anticipated that the device 36 may be any one or more of the heat transfer devices typically associated with a particular work machine.

As best illustrated in FIG. 2, a middle separating member 22 extends laterally on at least one side between the respective fans 12 and 14 so as to separate and isolate the space 42 defined by and between fan 12 and hydraulic oil core 38 from the space 44 defined by and between fan 14 and transmission oil core 40. In this regard, middle separating member 22 may also extend completely across the space between core devices 30 and 36 thereby likewise separating space 34 into two separate spaces similar to spaces 42 and 44. This particular arrangement wherein the air flow associated with the two fans 12 and 14, at least on one side thereof, are ducted separately by the middle separating member 22 allows the speed of the respective fans to be controlled separately and independently as a function of the cooled fluid temperature associated with the particular cores thereby burning less fuel and reducing noise exposure when at least some of the cores 26, 30, 38 and 40 do not require cooling. This arrangement also substantially prevents internal recirculation of the air expelled from fans 12 and 14 when the fans are operating at different speeds. A design feature in the downstream cores 30, 38 and 40 density ensures they are matched in restriction to permit equal air flow through left core 30 and right cores 38 and 40 to optimize both heat exchanger and fan performance. Shrouds (not shown) similar to shrouds 16, 18 along with separating members (not shown) likewise preferably extend between the front and rear peripheral edges of fans 12 and 14 to the respective front and rear portions of core device 36 so as to again prevent the air being expelled radially by fans 12 and 14 on this particular side of the present cooling system 10 from escaping the respective spaces 42 and 44 without first passing through the core devices 38 and 40. Core devices 38 and 40 likewise each include a plurality of fins 46 and 48 respectively.

Fins 28 associated with the ATAAC core 26 are preferably implemented in a higher frequency than fins 32, 46, and 48 associated with the radiator core 30, the hydraulic oil core 38, and the transmission oil core 40 respectively. The difference in fin densities serves an important purpose of preventing debris from entering the various heat transfer devices. Larger debris carried by air upstream from fans 12 and 14 is filtered out by the higher density fin configuration 28 associated with the ATAAC core 26, and such debris does not reach the fans 12 or 14. On the other hand, smaller debris that passes through the fin configuration 28 should exit the enclosed spaces 34, 42 and 44 of the present system 10 through the fins 32 associated with the radiator core 30, the fins 46 associated with the hydraulic oil core 38, and/or the fins 48 associated with the transmission oil core 40 because these fins have a lower density configuration as compared to fins 28. The spacing between fins 32, 46, and 48 therefore are comparatively wider as compared to the spacing between fins 28 and anything passing through the smaller openings between fins 28 should also pass through the comparatively larger openings between fins 32, 46, or 48. Designing the upstream core device 26 with a higher fin density allows core 26 to act as a filter trapping debris on the outside of the core face. Placing the fans 12 and 14 in between the upstream and downstream core devices also allows for easy cleaning through access ports 50 in the upstream shroud 15. These access ports 50 allow for easy access to any debris that may be trapped in the space 34 or between the fins 28 by inserting an air wand or other device well known in the art through the access ports 50 and either blowing or sucking out the debris trapped therebetween.

INDUSTRIAL APPLICABILITY

As described herein, the present twin fan cooling system arrangement has particular utility in all types of work machines and other vehicles utilizing heat transfer devices. The present cooling system is a compact and well balanced arrangement. Placing two heat exchanger cores on the respective opposite discharge sides of the twin radial fans, and placing four separate heat exchanger cores both upstream and downstream of the twin fan arrangement uses less axial length as compared to placing all four heat exchangers in two or three planes in series with the fans. In the present fan arrangement, the fans 12 and 14 lie in the same plane. This combination also adds more restriction to the air flow stream exiting the fans as compared to placing all four cores in a parallel arrangement thereby improving, the heat transfer capability and radial fan efficiency of the cooling system, as well as noise attenuation.

The positioning of the twin fans 12 and 14 as well as the shrouds 15, 16, 18, along with separating members 20, 22 and 24 help to attenuate noise emitted by the fans. Sound waves emitted by the fans towards the front of the fans are attenuated by the ATAAC core or other heat transfer device 26 and any fluid contents thereof; sound waves emitted towards one side of the twin fans are attenuated by the radiator core or other heat transfer device 30 and any engine coolant contained therein; and sound waves emitted towards the opposite side of the twin fans are attenuated by the hydraulic oil core 38 and the transmission oil core 40, or any other heat transfer device, and any fluid contents thereof. Shrouds 15, 16, 18, along with separating members 20, 22 and 24 surrounding the twin fan arrangement likewise help to attenuate sound waves emitted in their respective directions. In this regard, the backside of the downstream shrouds 18 also serves as a noise wall to isolate engine noise inside the engine enclosure. With this particular design, no separate wall or other barrier is required for this function. As a result, placing the present fans 12 and 14 between the upstream and downstream cores means that a direct line of sight to the respective fans as a potential noise source is blocked in all directions thereby reducing the exterior noise level. In addition, the fin and tube core matrix may also provide noise attenuation in the low frequency range. If the present cooling system package is well sealed from the engine compartment, a high attenuation enclosure will be realized. This twin fan arrangement 10 therefore further helps in reducing noise pollution and meeting tougher noise regulations worldwide.

The use of the present twin fan arrangement 10 also permits individual control of each fan. As discussed above, middle separating member 22 prevents interference between air expelled radially by fans 12 and 14 to hydraulic oil core 38 and transmission oil core 40 respectively. The speed of each fan can therefore be controlled according to the cooling needs of the respective core served by that particular fan. Because the air drawn in by each fan passes through ATAAC core 26, and the air expelled radially on the side of radiator core 30 by each fan passes through radiator core 30, the cooling requirements for these two cores can be met by the collective performance of both fans combined. Accordingly, the speed of each fan can be individually controlled to satisfy the requirements of each core, whether such core is served by one fan or by both fans. This capability reduces the total power requirements of the fans as well as improves the overall efficiency of the work machine.

It is also recognized and anticipated that the heat exchanger devices 26, 30 and 36 can be heat transfer devices other than those specifically identified above. In this regard, heat exchanger cores other than an ATAAC core, a radiator core, a hydraulic oil core and a transmission oil core could be positioned and located adjacent the fans 12 and 14 depending upon the particular work machine or other vehicle involved without departing from the sprit and scope of the present invention. In this regard, each respective heat exchanger device such as device 36 may include one or more heat transfer cores such as separate heat transfer cores 38 and 40. It is also recognized that device 36 could be a single core similar to cores 26 and 30. Other variations and modifications are likewise possible.

Also, as is evident from the foregoing description, certain aspects of the present invention are not limited to the particular details of the examples illustrated herein. It is therefore contemplated that other modifications and applications such as arranging and using any plurality of fans in the present fan/core arrangement will occur to those skilled in the art. It is accordingly attended that all such modifications, variations, and other uses and applications which do not depart from the sprit and scope of the present invention are deemed to be covered by the present invention.

Other aspects, objects and advantages of the present invention can be obtained from a study of the drawings, the disclosure and the appended claims.

What is claimed is:

1. A cooling system for cooling heat transfer devices in a work machine comprising:
   a pair of radial fans positioned vertically one on top of the other;
   a first heat transfer device positioned upstream from said pair of fans;
   a second heat transfer device positioned adjacent to and downstream from one side of said pair of fans;
   a third heat transfer device positioned adjacent to and downstream from the opposite side of said pair of fans;
   at least one downstream shroud positioned around said pair of fans for guiding the flow of air expelled therefrom to said second and third heat transfer devices; and
   said fans creating air flow through said first, second and third heat transfer devices.

2. The cooling system as set forth in claim 1, wherein at least one upstream shroud is positioned between said first heat transfer device and said plurality of fans for ducting of the flow of air into said plurality of fans.

3. The cooling system as set forth in claim 1, wherein said third heat transfer device includes a pair of heat transfer devices.

4. The cooling system as set forth in claim 1, wherein each of said heat transfer devices has a core density associated respectively therewith, the core density associated with said first heat transfer device being greater than the core density associated with said second and third heat transfer devices.

5. The cooling system as set forth in claim 1, wherein at least one separating member is positioned and located so as to separate the air flow streams generated by each respective fan to prevent internal recirculation thereof.

6. A cooling system for cooling heat transfer devices in a work machine comprising:

a plurality of fans positioned so as to be located in the same plane;

a first heat transfer device positioned upstream from said plurality of fans;

a second heat transfer device positioned adjacent one side of said fans;

a third heat transfer device positioned adjacent the opposite side of said fans; and said fans creating air flow through said first, second and third heat transfer devices.

7. The cooling system as set forth in claim 6, wherein said plurality of fans includes a pair of fans vertically arranged one on top of another.

8. The cooling system as set forth in claim 6, wherein said plurality of fans includes a pair of fans horizontally arranged in relationship to each other.

9. The cooling system as set forth in claim 7, wherein said pair of fans are radial fans.

10. The cooling system as set forth in claim 6, wherein said first heat transfer device is an air to air aftercooling core.

11. The cooling system as set forth in claim 6, wherein said second heat transfer device is a radiator core.

12. The cooling system as set forth in claim 6, wherein said third heat transfer device includes a plurality of heat transfer devices.

13. The cooling system as set forth in claim 12, wherein the plurality of heat transfer devices associated with said third heat transfer device includes a hydraulic oil core and a transmission oil core.

14. The cooling system as set forth in claim 6, wherein said first, second and third heat transfer devices each include a plurality of fins, said first heat transfer device having a higher fin density than said second and third heat transfer devices.

15. The cooling system as set forth in claim 6, wherein at least one downstream shroud is positioned around said plurality of fans for guiding the flow of air expelled by each respective fan to said second and third heat transfer devices.

16. The cooling system as set forth in claim 15, wherein at least one said downstream shroud extends from a front peripheral edge of said fans to an edge of said second and third heat transfer devices, and at least one said downstream shroud extends from a rear peripheral edge of said fans to an edge of said second and third heat transfer devices.

17. The cooling system as set forth in claim 6, wherein at least one upstream shroud is positioned between said first heat transfer device and said plurality of fans for ducting of the flow of air into said plurality of fans.

18. The cooling system as set forth in claim 17, wherein the at least one of said upstream shroud includes at least one access port for cleaning out debris.

19. A method for cooling heat transfer devices in a work machine including the steps of:

positioning a plurality of fans so as to be located in the same plane;

positioning a first heat transfer device upstream from said plurality of fans;

positioning a second heat transfer device adjacent one side of said fans;

positioning a third heat transfer device adjacent the opposite side of said fans; and creating air flow through said first, second and third heat transfer devices by said fans.

20. The method for cooling heat transfer devices in a work machine as set forth in claim 19, wherein said step of positioning a first heat transfer device upstream from said plurality of fans further includes the step of arranging a pair of fans vertically one on top of another.

21. The method for cooling heat transfer in devices in a work machine as set forth in claim 19, wherein said step of positioning a first heat transfer device upstream from said plurality of fans includes utilizing an air to air aftercooling core.

22. The method for cooling heat transfer devices in a work machine as set forth in claim 19, wherein said step of positioning a plurality of fans so as to be located in the same plane further includes the step of positioning at least one downstream shroud around said plurality of fans for guiding the flow of air expelled by each respective fan to said second and third heat transfer devices.

23. The method for cooling heat transfer devices in a work machine as set forth in claim 19, further including the step of positioning at least one upstream shroud between said first heat transfer device and said plurality of fans for ducting of the flow of air into said plurality of fans.

24. A method for cooling heat transfer devices in a work machine including the steps of:

positioning a pair of radial fans vertically one on top of the other;

positioning a first heat transfer device upstream from said pair of fans;

positioning a second heat transfer device adjacent to and downstream from one side of said pair of fans;

positioning a third heat transfer device adjacent to and downstream from the opposite side of said pair of fans;

positioning at least one downstream shroud around said pair of fans for guiding the flow of air expelled therefrom to said second and third heat transfer devices; and creating air flow through said first, second and third heat transfer devices by said fans.

25. A method for cooling heat transfer devices in a work machine including the steps of:

positioning a pair of radial fans vertically one on top of the other;

positioning a first heat transfer device upstream from said pair of fans;

positioning a second heat transfer device adjacent to and downstream from one side of said pair of fans;

positioning a third heat transfer device adjacent to and downstream from the opposite side of said pair of fans;

positioning at least one upstream shroud between said first heat transfer device and said pair of fans for ducting of the flow of air into said plurality of fans;

positioning at least one downstream shroud around said pair of fans for guiding the flow of air expelled therefrom to said second and third heat transfer devices; and creating air flow through said first, second and third heat transfer devices by said fans.

* * * * *